No. 780,952. PATENTED JAN. 24, 1905.
W. MARTENS.
POROUS EARTHENWARE FILTER.
APPLICATION FILED JUNE 24, 1904.
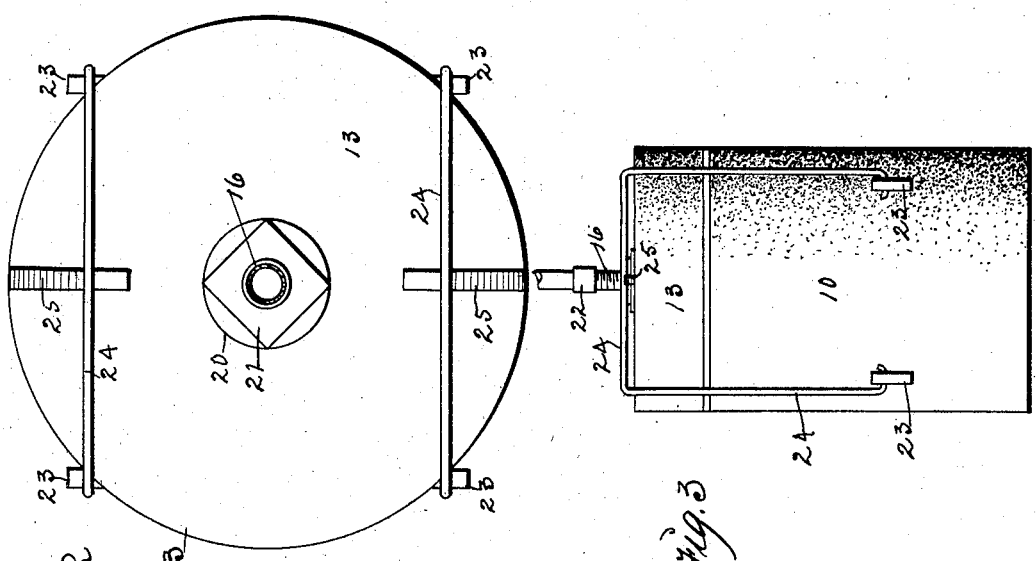
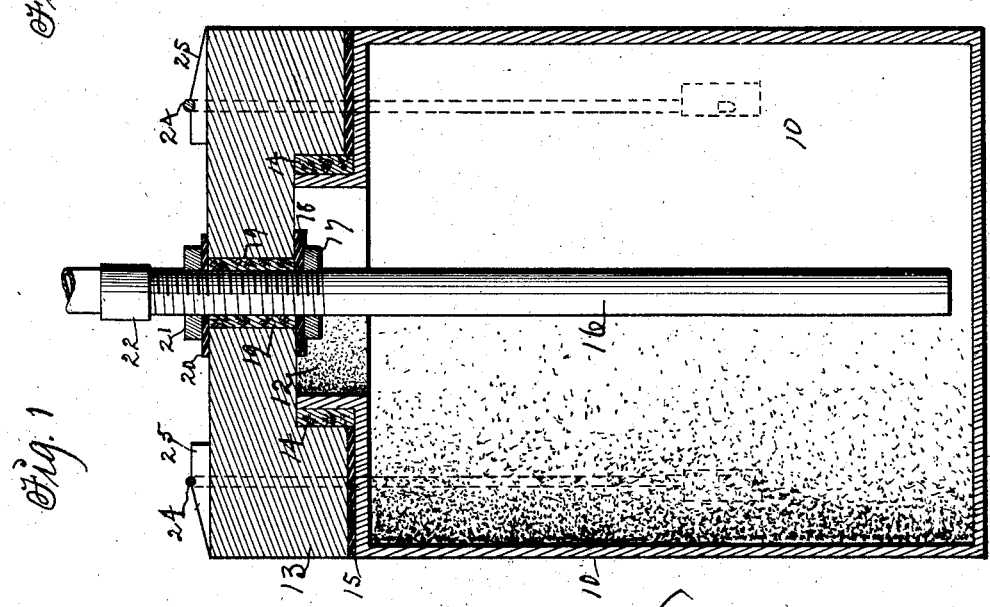

No. 780,952. Patented January 24, 1905.

UNITED STATES PATENT OFFICE.

WILLIAM MARTENS, OF ACKLEY, IOWA.

POROUS EARTHENWARE FILTER.

SPECIFICATION forming part of Letters Patent No. 780,952, dated January 24, 1905.

Application filed June 24, 1904. Serial No. 214,040.

*To all whom it may concern:*

Be it known that I, WILLIAM MARTENS, a citizen of the United States, residing at Ackley, in the county of Hardin and State of Iowa, have invented a new and useful Porous Earthenware Filter, of which the following is a specification.

My object is to provide a porous filter for cisterns and wells that is adapted to be submerged and to be detachably connected with a well-tube for supplying filtered water and also adapted to be lifted out of the water by means of the well-tube and opened and cleaned whenever necessary.

My invention consists in the construction, arrangement, and combination of parts, as hereinafter set forth, pointed out in my claims, and illustrated in the accompanying drawings, in which—

Figure 1 is a vertical central sectional view that shows the forms of all the combined parts. Fig. 2 is a top view that shows the pivoted bails in position as required to engage cams on the surface for locking the removable top to the filter vessel. Fig. 3 is an outside view of reduced size that shows the filter closed as required for practical use.

The numeral 10 designates a cylindrical and porous earthenware vessel that may vary in size as desired. It has a short integral open neck 12 at its top and center.

A removable top 13, made of burnt clay or other suitable material, has a circular cavity in its under side and is fitted to the neck 12 and top of the vessel 10, as shown in Fig. 1, a cork collar 14 placed on the neck and a leather or rubber washer 15 on top of the vessel and around the cork collar.

A section of well-tube 16 is screw-threaded at its upper end and a nut 17 fixed thereon and a leather or rubber washer 18 placed on top of the nut and a cork bushing 19 on top of the washer and the tube and collar then jointly passed up through a central bore in the top 13 and a washer 20 put on top of the cork collar and a nut 21 on top of said washer and drawn tight on the tube as required to clamp all the parts together to produce an air-tight joint between the tube 16 and top 13 and to fasten them together so they can be jointly moved in connecting and disconnecting them with the vessel 10.

A union 22 at the top of the tube-section 16 is provided for extending the well-tube by adding sections thereto as required for cisterns or wells of different depths.

To lock the combined top and well-tube on the vessel as required to produce an air-tight joint, the vessel 10 is provided with integral perforated lugs 23, and wire bails 24 are pivoted to the lugs, as shown in Fig. 3, and integral cams 25 formed on the top 13 in such a manner that when the tops of the bails are pressed inward over the cams they will bind fast thereon and clamp the top 13 tight upon the vessel as required for practical use when the vessel is submerged in a cistern or well, and a pump connected with the well-tube.

Having thus set forth the purpose of my invention and the manner of using it, it is obvious it can be lifted out of the water and readily opened and cleaned when necessary, and the advantages and utility thereof will be readily understood by persons familiar with the art to which it pertains, and

What I claim as new, and desire to secure by Letters Patent, is—

1. A cover for a filter vessel provided with a central circular cavity in its under side and a vertical concentric bore, a cork bushing in said bore, a well-tube extended through the said collar, a washer and a nut on the under side of the cork collar and a washer and a nut on the top of said collar and the top of the cover, a porous earthenware vessel having an open neck at its top and center, a cork collar on said neck and a washer around the said collar and the top of the vessel arranged and combined as shown and described for the purposes stated.

2. A filter for cisterns and wells comprising a porous earthenware vessel having an open neck at its top and center and bails pivotally connected with its exterior lower portion, a collar on the said neck and on top of the vessel, a cover having a central cavity to admit the neck of the vessel, a vertical bore in the center of the cover, a bushing in said bore, a well-tube extended up through the said bore and bushing, a washer and nut below the cover and a washer and nut on top of the cover and cams on top of the cover to engage the pivoted bails, arranged and combined for the purposes stated.

WILLIAM MARTENS.

Witnesses:
S. S. TRAINER,
S. Y. EGGERT.